US012562887B2

(12) United States Patent
Jones et al.

(10) Patent No.: US 12,562,887 B2
(45) Date of Patent: Feb. 24, 2026

(54) DATA PROTECTION USING PSEUDONYMIZATION AND ANONYMIZATION

(71) Applicant: Disney Enterprises, Inc., Burbank, CA (US)

(72) Inventors: Caleb Jones, Lake Stevens, WA (US); Christine Tribble, Campbell, CA (US)

(73) Assignee: Disney Enterprises, Inc., Burbank, CA (US)

( * ) Notice: Subject to any disclaimer, the term of this patent is extended or adjusted under 35 U.S.C. 154(b) by 151 days.

(21) Appl. No.: 18/539,116

(22) Filed: Dec. 13, 2023

(65) Prior Publication Data

US 2025/0202683 A1     Jun. 19, 2025

(51) Int. Cl.
*H04L 9/08*        (2006.01)
*G06F 21/62*       (2013.01)
*H04L 9/06*        (2006.01)

(52) U.S. Cl.
CPC ........ *H04L 9/0819* (2013.01); *G06F 21/6227* (2013.01); *H04L 9/0643* (2013.01)

(58) Field of Classification Search
USPC ........................................................ 713/168
See application file for complete search history.

(56) References Cited

U.S. PATENT DOCUMENTS 10,970,418 B2 *  4/2021  Durvasula ........... G06F 21/6254
12,242,642 B2    3/2025  Senerth et al.

2008/0216174 A1 *  9/2008  Vogel .................. G06F 21/6245
                                                                726/22
2009/0222675 A1 *  9/2009  Lange ..................... G06F 21/64
                                                                711/216
2016/0352695 A1 * 12/2016  Kozolchyk ......... H04L 63/0428
2019/0334874 A1 * 10/2019  Frost .................. H04L 63/0272
2020/0350058 A1 * 11/2020  Xiao ...................... G06Q 50/04
2023/0134781 A1    5/2023  Senerth et al.

OTHER PUBLICATIONS

"ISO/IEC 20889:2018: Privacy enhancing data de-identification terminology and classification of techniques," ISO: Standard, Publication Dated: Nov. 2018 Date Accessed: Dec. 13, 2023, pp. 1-2 [Abstract Only].
U.S. Appl. No. 18/677,529, filed May 29, 2024.

* cited by examiner

*Primary Examiner* — Sanchit K Sarker
(74) *Attorney, Agent, or Firm* — Patterson + Sheridan, LLP; Gero G. McClellan

(57)        ABSTRACT

Techniques relating to data privacy are disclosed. These techniques include identifying data fields relating to a first data record, and generating transformed data fields by transforming the data fields using one or more transformations. Each of the transformations includes at least one of: (i) a hash function or (ii) a surrogate key function. The techniques further include generating encrypted data fields by encrypting the data fields using a respective encryption key, and storing the transformed data fields, the encrypted data fields, and of encryption keys. This includes storing the transformed data fields in one or more first storage locations, storing a first mapping between each of the transformed data fields and a corresponding encrypted data field in one or more second storage locations, and storing a second mapping between each of the transformed data fields and a corresponding encryption key in one or more third storage locations.

20 Claims, 10 Drawing Sheets

300

START

302 RECEIVE NEW DATA

304 IDENTIFY SENSITIVE DATA

306 ENCRYPT AND TRANSFORM DATA

308 STORE ENCRYPTED AND TRANSFORMED DATA

310 STORE ENCRYPTION KEYS AND MAPPING

END

500

START

502 — Receive Activation Request for Sensitive Data

504 — Identify Mapped Encryption Keys for Encrypted Data

506 — Decrypt Data

508 — Provide Activated Data

END

600

700

DATA PROTECTION USING PSEUDONYMIZATION AND ANONYMIZATION

BACKGROUND

Enterprise data protection should both protect sensitive data so that it cannot be tied back to a particular individual, and reduce, to the extent possible, the accessibility of sensitive data within the enterprise platform. This can help increase protection for sensitive data. Further, this can help reduce access to personal information (PI) and sensitive personally identifiable information (PII) to only teams and roles that require such access. This can also reduce the risks of a data breach, and minimize the impact should one occur.

Solutions to data security frequently rely on a "privacy-on-read" model, in which access to sensitive data is protected at access, read, or query time. Privacy-on-read is often implemented and enforced via table or SQL views, dynamic masking, table and field permissions, use of proxies, or access controls. The approach for implementing privacy-on-read across source systems will vary from system to system and will also depend on the format or structure of the data. This approach can work for some highly structured datasets, but a holistic approach to privacy on read will need to translate the desired privacy policies across all technologies and data formats containing PI/PII in an organization (current and future). The creation and enforcement of any type of role-based access control (RBAC) permission model is extremely complex. Further, deletion of sensitive data in these models may require physically removing the data from where it is stored, or filtering or masking the data from view by users. This may be undesirable because physically removing the data is slow and computationally expensive, resulting in scanning and searching every record in every dataset across the platform.

Large scale data privacy can instead be achieved using a "privacy-on-write" approach that seeks to provide privacy in the way data is written, without relying on privacy-on-read approaches. This can be challenging as well, however, because sensitive data should still be recoverable in a protected way. This can be done through a governed transformation of the data (e.g., rather than a governed access to data in a privacy-on-read approach). For example, data can be anonymized (e.g., using encryption) or pseudonymized at an early stage of the data life-cycle to protect the security of the data. Once anonymized or pseudonymized, sensitive data is inherently protected and any technology can be used to access it regardless of that technology's "on read" privacy capabilities.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1A:
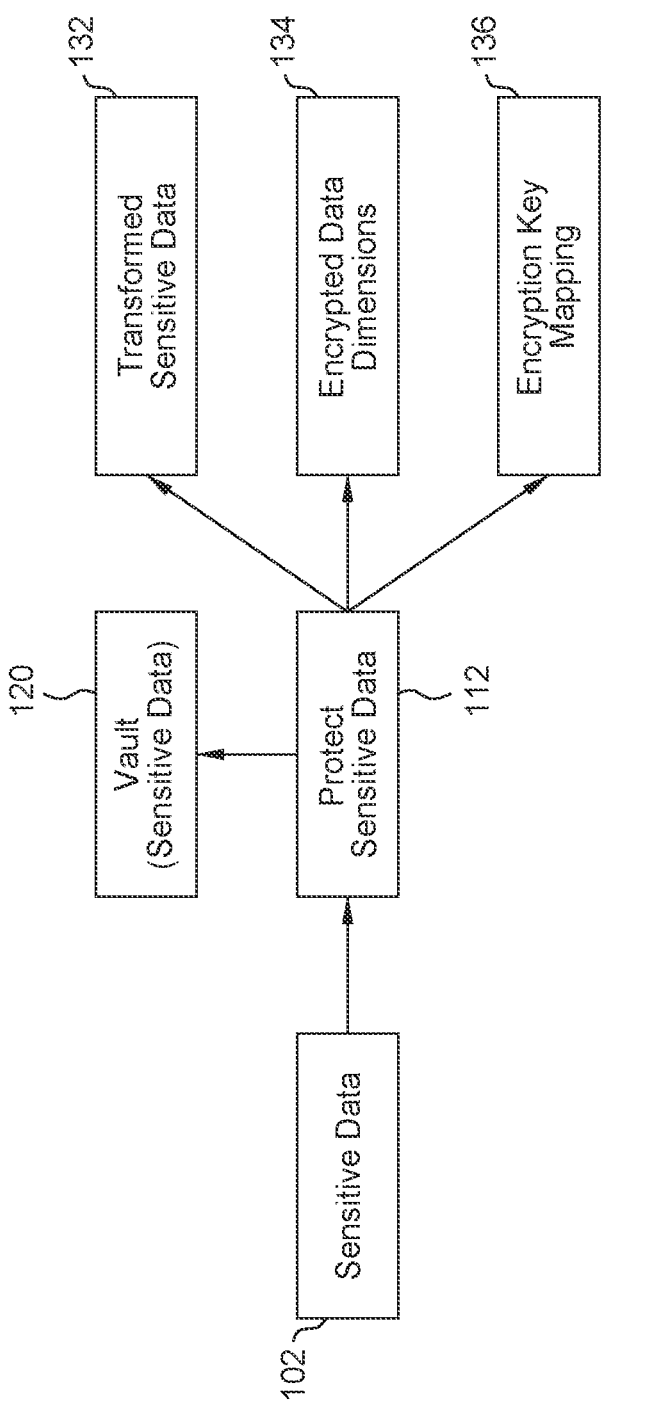
FIG. 1A illustrates privacy protection for sensitive data, according to an embodiment.

In an embodiment, as discussed further below, anonymizing (e.g., symmetric encryption using a secret key) and pseudonymizing (e.g., deterministic one-way hashing using a hash secret or use of numeric surrogate keys) can be used to protect sensitive data. But anonymizing and pseudonymizing have some drawbacks. For example, use of encryption may be able to fully anonymize data through generating random outputs. But because the same input value results in different output bytes, grouping, joins, and aggregations do not work (e.g., random encryption does not allow for joining of database tables on sensitive data fields). The use of fully anonymous data bars analysis for key operational metrics, and the data cannot be queried to meet reporting requirements. Pseudonymized data, by contrast, may be deterministic and usable for reporting, but not allow recovery of the sensitive data. This is discussed further in the ISO-20889 standard, titled "Privacy Enhancing Data De-Identification Terminology and Classification of Techniques."

Instead, sensitive data can both pseudonymized and anonymized. Both forms of stored data are protected, and cannot be directly used to recover the original sensitive data. Further, the pseudonymized (e.g., through hashing or use of surrogate keys) form of data can be used for data analytics (e.g., data joins and grouping) because the data transformation is deterministic (e.g., given an original value, the transformed value will always be the same). But the pseudonymized form of data cannot be used to recover the original data value (e.g., because the hash or surrogate key is one-way). Instead, the anonymized encrypted data can be used to recover the original data. For example, a suitable encryption key can be stored in a secure location and used to recover and activate the original data. Techniques for protecting sensitive data using both deterministic transformation and encryption are further described in U.S. patent application Ser. No. 17/518,232, which is herein incorporated by reference.

Further, sensitive data can be considered deleted from the system by deleting the associated encryption key, or unlinking the PI/PII or key from the pseudonymized data." For example, as discussed above, sensitive data can be stored in both pseudonymized (e.g., through hashing or use of surrogate keys) and encrypted form. In an embodiment, the hash function or surrogate key provides a one-way transformation, and cannot be used to recover the original sensitive data from the transformed value. The encrypted data can only be recovered using the associated encryption key. If the encryption key is deleted or unlinked, the encrypted data cannot be decrypted, and the original sensitive data cannot be recovered. The data can be considered deleted, since it cannot be recovered. Further, aggregated data analytics and reporting (e.g., that depend on the consistency of the number of records) are not impacted, because the pseudonymized values are not removed and remain stored in the environment.

Storing data in both encrypted and transformed (e.g., through hashing or use of surrogate keys) form can be further improved by pseudonymizing sensitive data and encrypting the data in separately governed dimension tables. Then, pseudonymized records may become unidentifiable when the ability to link back to those sensitive data dimensions is removed. As discussed herein, anonymized data is de-identified such that re-identification is no longer possible. Psuedonymized data is de-identified, but may be re-identified given access to encryption keys and mapping tables. Activation is a process of using sensitive information for approved business purposes (and may involve re-identification of data). De-identification relates to transforming a value such that the result can no longer be associated directly to the original value. And sensitive data includes any data that an implementation seeks to protect (e.g., PI, PII, confidential information, and any other suitable data). These terms are discussed further in the ISO-20889 standard, discussed above. In an embodiment, with separately governed mapping tables for sensitive data, unlinking can be done on a per-record level, providing for further flexibility and protection. As discussed below with regard to FIG. 1B, data can be stored across multiple datasets: transformed data (e.g., hashed or transformed using surrogate keys), encrypted dimension tables storing encrypted data, and a key store storing encryption keys. Exposure of all three of these datasets would be needed to expose the underlying sensitive data. This provides further protection by making the sensitive data robust to undesired exposure of individual datasets.

In an embodiment, using one or more of these techniques has numerous technical advantages. For example, a privacy-on-write approach can improve interoperability among software systems, as compared to a privacy-on-read approach, by eliminating complex rules and user roles needed to govern access to data. The way that RBAC permissions are implemented varies from system to system, requiring maintaining complex rulesets in different locations, or the dependence on a third party. The privacy-on-write approach can reduce development time, eliminate misconfigurations, and allow for a wider variety of interoperable systems. It can also allow for more adaptability and easier improvements to technical systems, as complex access rules and roles do not need to be maintained, and modified, as the system changes. This is particularly true when data is stored using separately governed dimension tables for different data fields or groups of data fields, further improving flexibility. As another example, storing sensitive data in both a transformed (e.g., hashed or using surrogate keys) and encrypted form provides for less computationally intensive access to, and deletion of, data. Data can be accessed merely by decrypting the data using a mapped encryption key, and can be deleted just by deleting the encryption key or the mapping of the encryption key to the data. Data can be easily grouped based on sensitive data fields (e.g., relational database tables can be joined on sensitive data fields) by using a suitable de-identification technique (e.g., hashing using a deterministic hash function, surrogate key generation, or any other suitable de-identification technique). By removing sensitive information from the entire environment, it allows the creation of new information sets without the possibility of sensitive data leaking from its known location.

FIG. 1A illustrates privacy protection for sensitive data, according to an embodiment. In an embodiment, a system receives or identifies sensitive data 102. For example, the sensitive data can include sensitive PI, sensitive PII, or any other suitable sensitive information. As one reference, PII has been defined by governmental entities as information which can be used to distinguish or trace an individual's identity, such as their name, social security number or other identifier, biometric records, etc. alone, or when combined with other personal or identifying information which is linked or linkable to a specific individual, such as date and place of birth, mother's maiden name, etc. These are merely examples. Further, sensitive data can be defined using suitable configuration files (e.g., prior to operation of a system or during operation of the system). For example, which data fields should be considered sensitive can be set using configuration files or any other suitable technique.

In an embodiment, at block 112 the sensitive data 102 is protected. This is discussed further, below, with regard to FIG. 3. For example, the sensitive data 102 can be transformed using hashing, surrogate keys, or any other suitable techniques to generate transformed sensitive data 132. As discussed above, in an embodiment the transformed sensitive data 132 is consistent, so it can be used for required metrics and reporting, but is generated using a one-way technique and so cannot be used to recover the sensitive data 102.

In an embodiment, protecting the sensitive data 102 at block 112 further generates encrypted data dimensions 134. This is further illustrated in FIG. 1B. For example, the encrypted data dimensions 134 can be separate dimension tables (e.g., in an electronic database) that maintain an encrypted form of the sensitive data 102. In an embodiment the encrypted data can be decrypted using a suitable key, and used to recover the sensitive data 102. But the encrypted data is not deterministic and cannot be used for required metrics and reporting. Further, the use of encrypted data dimensions 134 separates the encrypted data from the transformed data, so that both data repositories are needed to recover the sensitive data 102 and access (e.g., mistaken or malicious access) to either form of data cannot, by itself, be used to recover the sensitive data.

Protecting the sensitive data at block 112 can further, in an embodiment, generate an encryption ID to key mapping. As discussed above, the encrypted data maintained in the encrypted data dimensions 134 can only be recovered with a suitable encryption key. The encryption key mapping 136 can be maintained in a suitable key repository, and used to recover the sensitive data when permitted.

In an embodiment, protecting the sensitive data at block 112 can further generate a vault 120 for the sensitive data. Hashing or generating surrogate keys, combined with encrypting sensitive data, involves irreversible operations (e.g., replacing original values with one-way hashes, surrogate keys, or deletion of encryption keys). Careful consideration can be given to protect against potential errors or losses in the system. For example, if the key store maintaining the encryption key mapping 136 were to lose or corrupt the mappings, or an unrecoverable error in how the encryption or transformation occurs, it could lead to a catastrophic loss of data.

To protect against this kind of catastrophic loss, all data that is protected can be vaulted. For example, the original sensitive data 102 can be copied into separate storage before it is transformed as part of protecting the sensitive data. Access to vaulted data can be tightly governed for data recovery, approved operational-only, or large back-processing use cases.

Figure 1B:
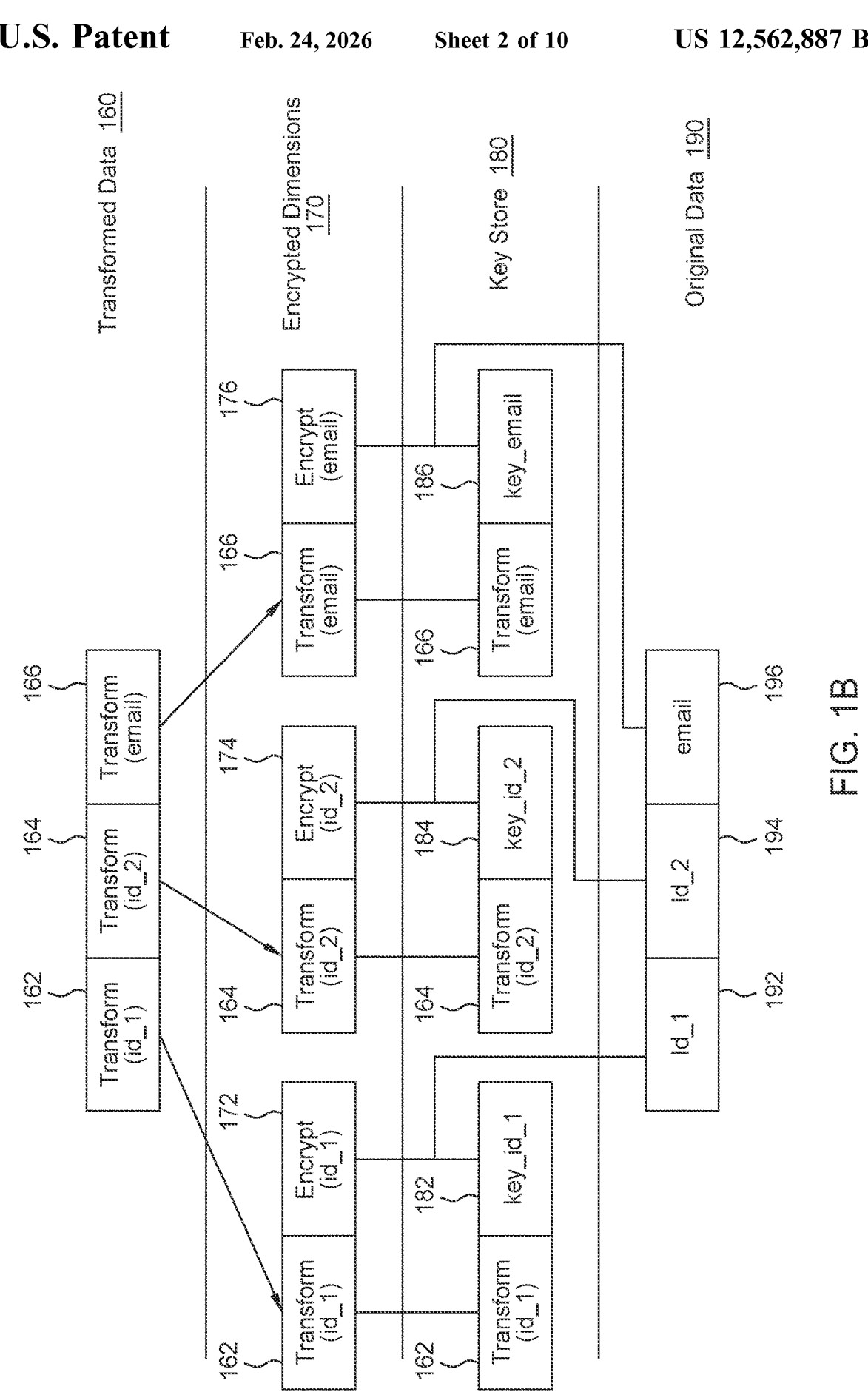
FIG. 1B illustrates activating protected sensitive data, according to an embodiment.

FIG. 1B illustrates activating protected sensitive data, according to an embodiment. As described above, in an embodiment sensitive data (e.g., PI or PII) can be protected by transforming and encrypting the data. For example, assume three fields are considered sensitive: id_1, id_2, and email. Data in these fields can be transformed using hashing, surrogate keys, or any other suitable technique to generate transformed data 160. For example, the transformed data 160 can include a transformed id_1 field 162, a transformed id_2 field 164, and a transformed email field 166. As discussed above, in an embodiment this transformed data is consistent, but cannot itself be used to re-identify (e.g., recover) the sensitive data (e.g., because the transformation is one-way).

Further, encrypted dimensions 170 and a key store 180 can be used to activate the data. For example, the encrypted dimensions 170 can include a number of separate dimension tables linking the transformed data with encrypted data. For example, the id_1 field data can be encrypted to generate the encrypted id_1 field 172. This encrypted id_1 field 172 can be linked with the transformed id_1 field 162. Similarly, the id_2 field data can be encrypted to generate the encrypted id_2 field 174. This encrypted id_2 field 174 can be linked with the transformed id_2 field 164. The email field data can be encrypted to generate the encrypted email field 176. This encrypted email field 176 can be linked with the transformed email field 166.

Thus, the encrypted dimensions 170 include the encrypted data (e.g., linked with the transformed data). But an encryption key is still needed to activate the data. In an embodiment, a key store 180 can include encryption keys (e.g., associated with each sensitive data field) and can link the encryption keys to the transformed data. For example, the key store 180 stores a key_id_1 182 linked with the transformed id_1 field 162, a key_id_2 184 linked with the transformed id_2 field 164, and a key_email 186 linked with the transformed email field 166. In an embodiment, access to the encrypted dimensions 170 and the key store 180 should be limited to the minimum required number or groups of personnel. Only trusted administrators, auditors, and systems activating data should be permitted to access these datasets.

In an embodiment, the respective encryption key can be used to decrypt the encrypted data and activate the original data 190. For example, key_id_1 182 can be used to decrypt the encrypted id_1 field 172 and recover the id_1 field 192. The key_id_2 184 can be used to decrypt the encrypted id_2 field 174 and recover the id_2 field 194. And the key_email 186 can be used to decrypt the encrypted email field 176 and recover the email field 196.

As discussed above, storing the sensitive data across these separate datasets (e.g., the transformed data 160, the encrypted dimensions 170, and the key store 180) provides further protection for the data. In order to expose the sensitive data, all three datasets must be exposed. If only one dataset is exposed, privacy is still protected. Further, even if two datasets are exposed most aspects of the sensitive data are protected. For example, exposure of the transformed data 160 and the encrypted dimensions 170 does not expose PI, because the PI is protected via encryption and there is no access to the encryption keys. Exposure of the transformed data 160 and the key store 180 does not expose the PI, because the encrypted data is not exposed. Exposure of the encrypted dimensions 170 and the key store 180 may expose individual PI elements, because they encryption key can be used to decrypt the encrypted data. But the PI's association to other data or PI is not exposed because the exposed data is not linked to other fields (e.g., only the given data field is exposed and it cannot be linked to other data).

Figure 2:
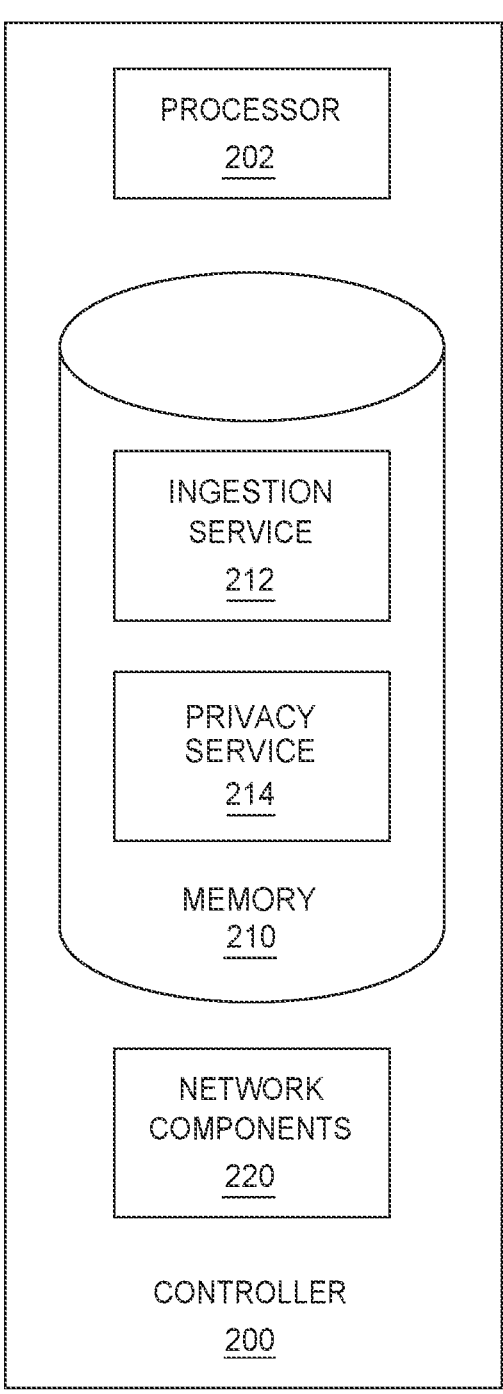
FIG. 2 is a block diagram illustrating a controller for privacy protection for sensitive data, according to an embodiment.

FIG. 2 is a block diagram illustrating a controller for privacy protection for sensitive data, according to an embodiment. The controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller 200 to interface with a suitable communication network (e.g., a communication network interconnecting various components of a computing environment maintaining sensitive data, or interconnecting the environment with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the 200. The program code is generally described as various functional "applications" or "modules" within the memory 210, although alternate implementations may have different functions and/or combinations of functions. Within the memory 210, the ingestion service 212 facilitates protecting sensitive data (e.g., generating transformed and encrypted versions of the data). This is discussed further, below, with regard to FIGS. 3 and 4A-B. The privacy service 214 facilitates recovering, coordinating, validating and deleting data. This is discussed further, below, with regard to FIGS. 5-8B.

While the controller 200 is illustrated as a single entity, in an embodiment, the various components can be implemented using any suitable combination of physical services, cloud compute nodes and storage locations, or any other suitable implementation. For example, the controller 200 could be implemented using a server or cluster of servers (e.g., maintained by the data owner). As another example, the controller 200 can be implemented using a combination of compute nodes and storage locations in a suitable cloud environment. For example, one or more of the components of the controller 200 can be implemented using a public cloud, a private cloud, a hybrid cloud, on premises cluster, or any other suitable implementation.

Figure 3:
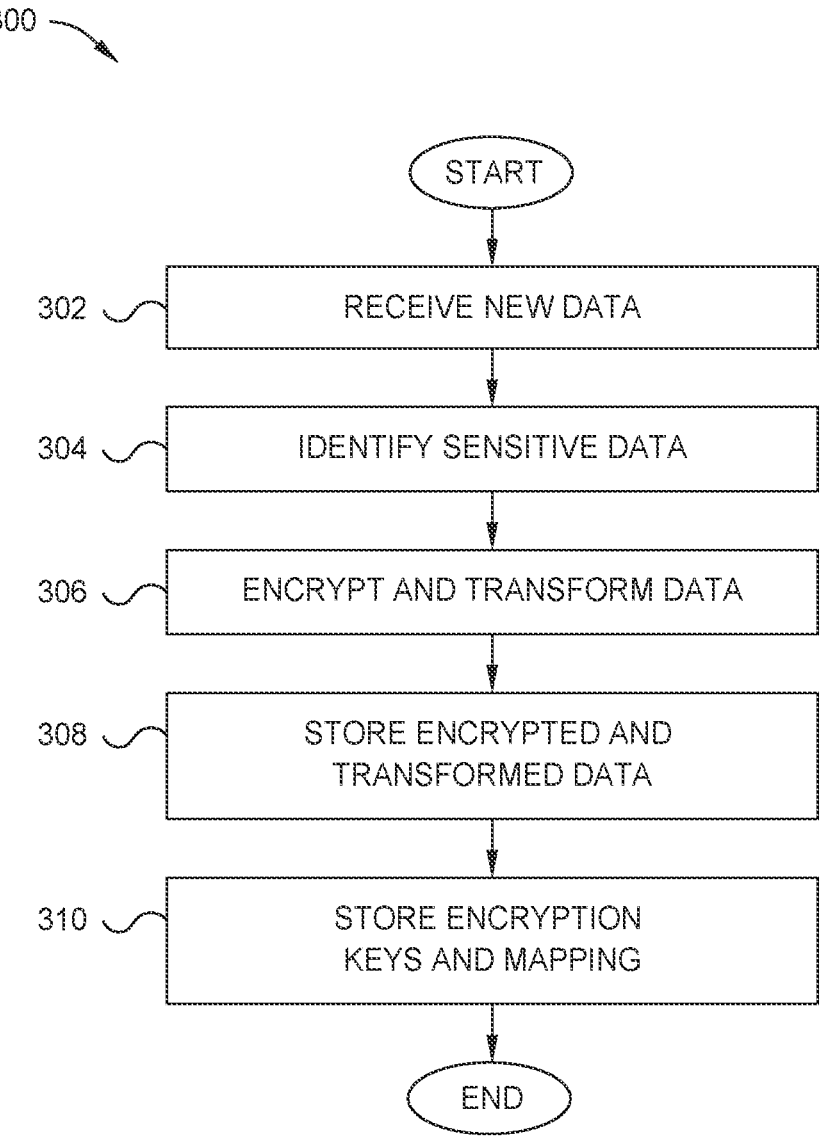
FIG. 3 is a flowchart illustrating privacy protection for sensitive data, according to an embodiment.

FIG. 3 is a flowchart 300 illustrating privacy protection for sensitive data, according to an embodiment. At block 302, an ingestion service (e.g., the ingestion service 212 illustrated in FIG. 2) receives new data. For example, as illustrated in FIG. 1A, the ingestion service can receive newly acquired data, including sensitive data 102.

At block 304, the ingestion service identifies sensitive data (e.g., among the newly received data). In an embodiment, the ingestion service has metadata identifying which data elements are sensitive (e.g., which has been preconfigured in the configuration based input files), sensitive PII, or any other suitable sensitive information. In an embodiment, a data manager can define data fields (e.g., name, social security number, etc.) as containing sensitive information (e.g., PII). The ingestion service can then identify whether the acquired data includes sensitive information. For example, the ingestion service can use one or more configuration files (e.g., as discussed above in relation to FIG. 1) to identify data fields including sensitive information.

At block 306, the ingestion service encrypts and transforms sensitive data. This is illustrated further, below, with regard to FIGS. 4A-B. For example, the ingestion service can ingest plain text PI or PII, and can generate both transformed pseudonymized data (e.g., transformed using hashing or surrogate keys) and encrypted data. In an embodiment the encrypted data is not deterministic, meaning the encryption technique generates a different random cipher for a given original value, each time the original value is encrypted. Further, in an embodiment, the transformed data is deterministic but is transformed using a one-way technique so that the original data cannot be recovered from the transformed data.

In an embodiment, the ingestion service can use a transformation (e.g., a hash function or surrogate keys) that is deterministic, such that given the same input, the transformation always produces the same output. For example, the ingestion service can use a Secure Hash Algorithm 2 (SHA-2) hash function (e.g., SHA-256). The ingestion service can further use a hash function that is one-way, such that it is impossible, or computationally impractical, to derive an original value from the associated hash value. Finally, the ingestion service can use a uniform hash function, which generates hash values that evenly distribute across the possible hash values and minimize collisions (e.g., minimize two different original values producing the same hash value).

In an embodiment, the ingestion service can use a hash secret as part of hashing the sensitive data. A hash secret can be combined with the sensitive data (e.g., prepended or appended to the original sensitive data before hashing), and then the combined data and hash secret is hashed, using the chosen hash function, to generate the hashed value. Use of a hash secret prevents indexing into the sensitive data by an actor with access to a portion of the data. For example, without use of a hash secret, a third-party actor with original sensitive data could use a hash function to index into the stored hashed data (e.g., because the hash function is deterministic) if that third party were able to determine exactly which hash function is being used during the hashing phase of anonymization of data. Use of a hash secret prevents this, because the third party does not have access to the hash secret and so cannot generate the correct hash from a given piece of original data. In an embodiment, the hash secret is kept secret and is stored in a secured vault location with extremely limited access.

Alternatively, or in addition, to hashing, surrogate keys may also be used. For example, a surrogate key can be an identifier (e.g., a unique identifier) for a data entity or object. In an embodiment, the surrogate key is not derived from the application data. Hashing could be considered a type of surrogate key but may have negative performance impacts (e.g., if used in joins and filters) and may not protect privacy as robustly as numeric surrogate keys. Numeric surrogate keys can be used instead, or in addition, and may provider higher performance or other benefits.

However, surrogate key algorithms should retain the following characteristics. First, they should be one-way. Given a surrogate key, it should be impossible or computationally impractical to derive the original value. Additionally, surrogate keys should not expose any portion of the original sensitive data (e.g., PI or PII). Second, surrogate keys should be proprietary. Surrogate keys should not be able to be re-generated by another party given the original sensitive data. Third, surrogate keys should be internal. Surrogate keys should remain internal to the system or platform they are generated in and should not be shared external to the system or platform in ways that allow them to be linked to sensitive data. Fourth, surrogate keys should avoid collisions. While not necessarily needing to be uniform, the attribute of not producing collisions maintains the integrity of data. Finally, surrogate keys should be consistent. While determinism may be a way to achieve this, surrogate keys do not necessarily need to be deterministic. However, they should be consistent across the platform for a given value. These are merely examples of characteristics of a suitable surrogate key technique, and a given implementation may have additional characteristics.

In an embodiment, the ingestion service can use a suitable symmetric encryption technique to encrypt the sensitive data. For example, the ingestion service can encrypt the sensitive data and generate a random cipher output (e.g., using 256 bit Advanced Encryption Standard with Galois Counter Mode (AES-256 GCM) with random initialization vector (random IV)). The encryption can be symmetric, meaning that decryption and encryption can be performed using the same secret key. Further, the encryption should be private, such that the cipher text does not reveal any information about the secret key or the original value. Without the encryption key used to encrypt the information, it is not possible to decrypt the information.

Further, in an embodiment, the ingestion service can use encryption keys that map to the sensitive data. As illustrated in FIG. 1B, encrypted dimensions (e.g., the encrypted dimensions 170) and a key store (e.g., the key store 180) can be used to maintain the encrypted data and encryption keys. Encryption keys can be created in a distributed fashion, using a primary identifier for a record as an input to the encryption key.

At block 308, the ingestion service stores encrypted and transformed data. For example, the ingestion service can store the encrypted and hashed data in a suitable persistent storage location. For example, the ingestion service can store the encrypted and hashed data in an electronic database (e.g., a relational database, a graph database, or any other suitable electronic database), a distributed network storage location (e.g., a public-cloud, private-cloud, or hybrid-cloud storage location), a network accessible remote storage location, a local storage location, or any other suitable persistent storage. In an embodiment, only protected versions (e.g., transformed and encrypted versions) of any sensitive data is stored in the repository, and the sensitive data is not stored in an identifiable form.

At block 310, the ingestion service stores encryption keys and mapping. As discussed above in relation to FIG. 1B, in an embodiment the ingestion service can maintain encrypted dimensions and a key store linking the transformed data and encrypted data. For example, transformed data (e.g., pseudonymized data) can be stored in encrypted dimension tables linked with encrypted data. Further, a key store can maintain a link between the transformed data and an encryption key used to decrypt the encrypted data. The encrypted dimension tables can include a table for each data field, for a group or data fields, or for any other suitable combination of data fields. In an embodiment, this improves privacy by ensuring that multiple tables and links are required to recover encrypted data. Access to any given level in the data storage (e.g., any of the transformed data 160, the encrypted dimensions 170, or the key store 180 illustrated in FIG. 1B), alone, does not link to the sensitive data or allow recovery of the sensitive data.

Figure 4A:
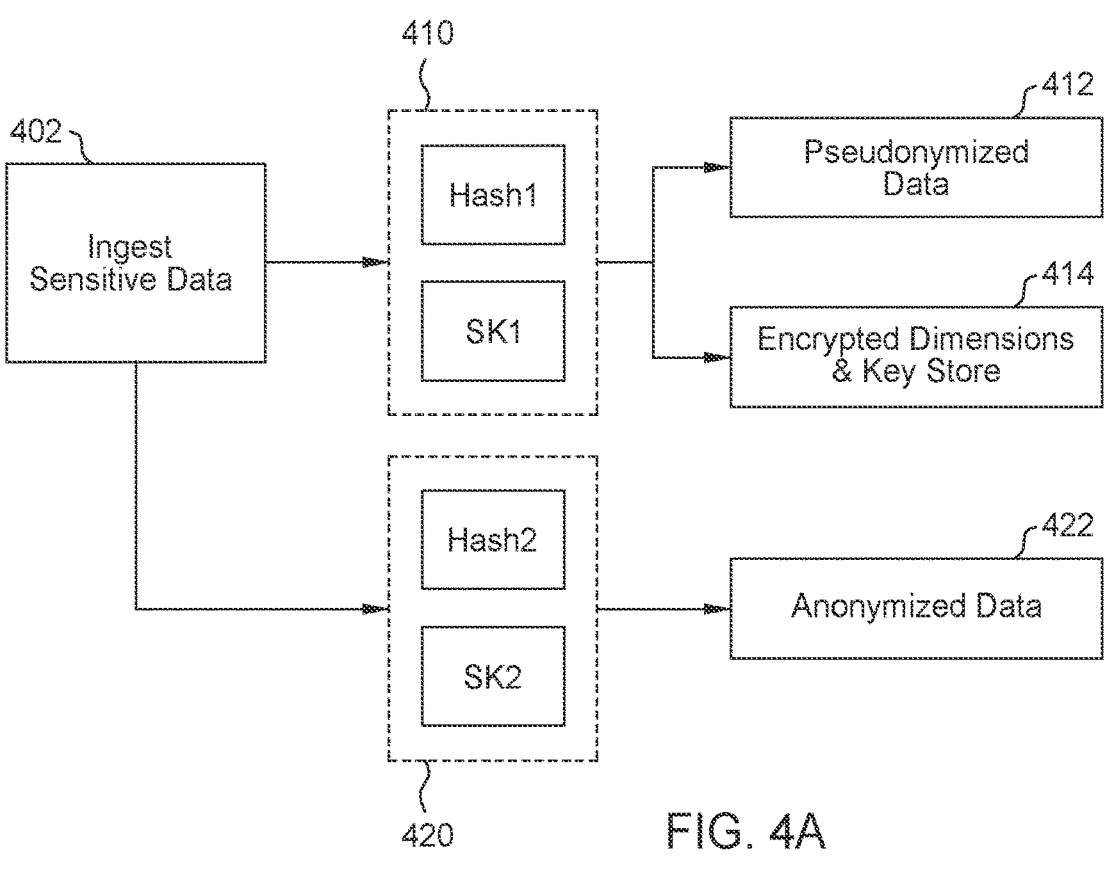
FIG. 4A illustrates both anonymizing and pseudonymizing sensitive data, according to an embodiment t.

FIG. 4A illustrates both anonymizing and pseudonymizing sensitive data, according to an embodiment. As illustrated above in FIG. 1A, in one embodiment all sensitive data is pseudonymized such that the data can be recovered. Alternatively, or in addition, some data can be pseudonymized such that the original data can be recovered while other data is fully anonymized such that the original data cannot be recovered.

For example, at block 402 an ingestion service (e.g., the ingestion service 212 illustrated in FIG. 2) ingests sensitive data (e.g., the sensitive data 102 illustrated in FIG. 1A). In an embodiment, a portion of this data is pseudonymized, similarly to the techniques discussed above in relation to FIG. 1A. For example, the ingestion service transforms the sensitive data at block 410 (e.g., using hashing or surrogate keys) to generate pseudonymized data 412. The ingestion service further generates encrypted dimensions and a key store 414, which can be used to recover the sensitive data.

Different data, however, can be fully anonymized. For example, at block 420 the ingestion service can transform the sensitive data (e.g., using hashing or surrogate keys) to generate anonymized data 422. This anonymized data 422 is not linked with encrypted dimensions or a key store, and cannot be recovered (e.g., assuming the transformation at block 420 is a one-way transformation). Further, at block 420 the ingestion service can use a different secret or algorithm for the transformation than used at block 410, further protecting the data. In an embodiment, this enables an environment where some data (e.g., some individual records or groups or records) are anonymized (e.g., not linkable to the original sensitive data) and others are pseudonymized (where linking is still possible).

Further, in an embodiment, different secrets (e.g., hash secrets) or algorithms for hashing or surrogate keys can be used for different data. This can place the data in a different hash or key space such that it cannot be joined to data with a different secret or algorithm. This may be useful for requirements that prohibit co-mingling of data. For instance, if IDs for one cohort of data must never be joined with IDs in another cohort, the use of two different hash secrets or surrogate key algorithms guarantees this restriction.

Figure 4B:
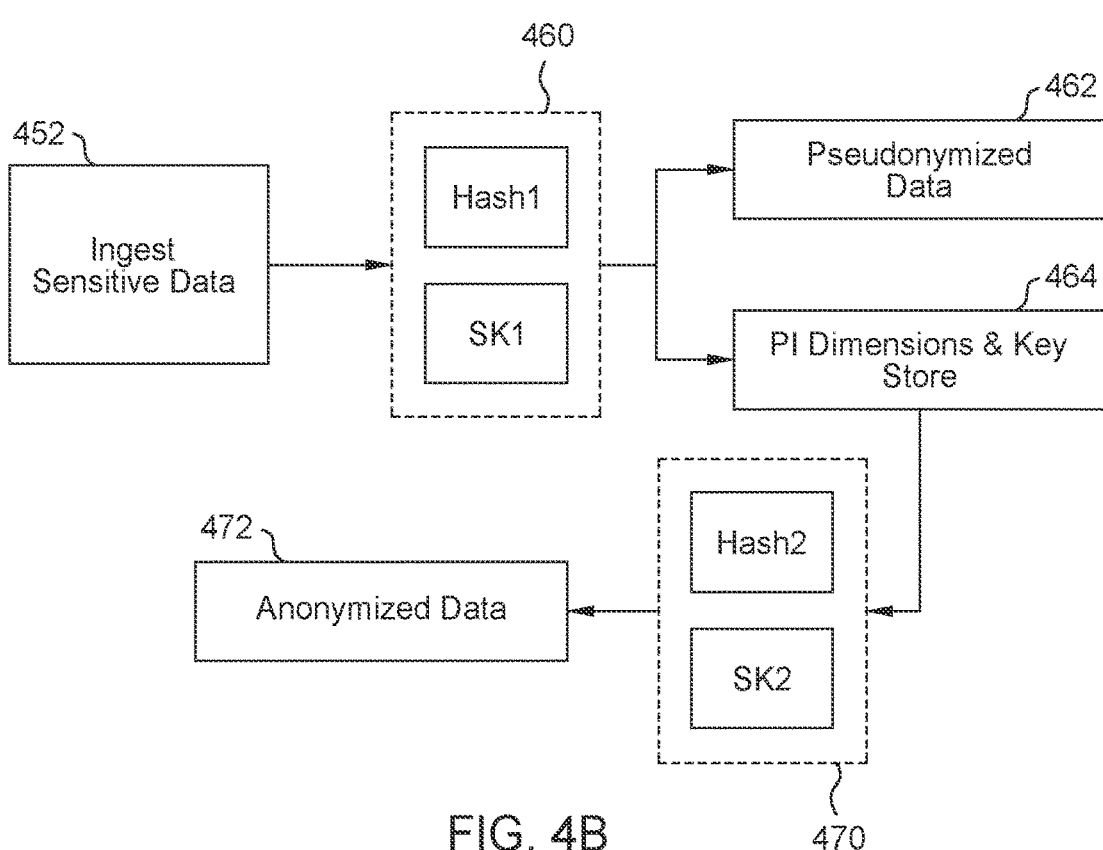
FIG. 4B further illustrates both anonymizing and pseudonymizing sensitive data, according to an embodiment.

FIG. 4B further illustrates both anonymizing and pseudonymizing sensitive data, according to an embodiment. Depending on the application, it may not be desirable to pseudonymize and anonymize data at the same time at ingest. For example, this could lead to duplication of logic being executed in both the pseudonymized and anonymized environments. In this case, anonymization can be performed on pseudonymized data.

For example, at block 452 an ingestion service (e.g., the ingestion service 212 illustrated in FIG. 2) ingests sensitive data (e.g., the sensitive data 102 illustrated in FIG. 1A). The ingestion service transforms the sensitive data at block 460 (e.g., using hashing or surrogate keys) to generate pseudonymized data 462. The ingestion service further generates encrypted dimensions and a key store 464, which can be used to recover the sensitive data.

In an embodiment, the ingestion service further transforms the pseudonymized data 462 using an additional transformation at block 470 (e.g., hashing or using surrogate keys). This generates anonymized data 472. In an embodiment, because anonymization is a one-way operation, it does not necessarily need to be performed on the original sensitive data but can also be performed on pseudonymized data.

Figure 5:
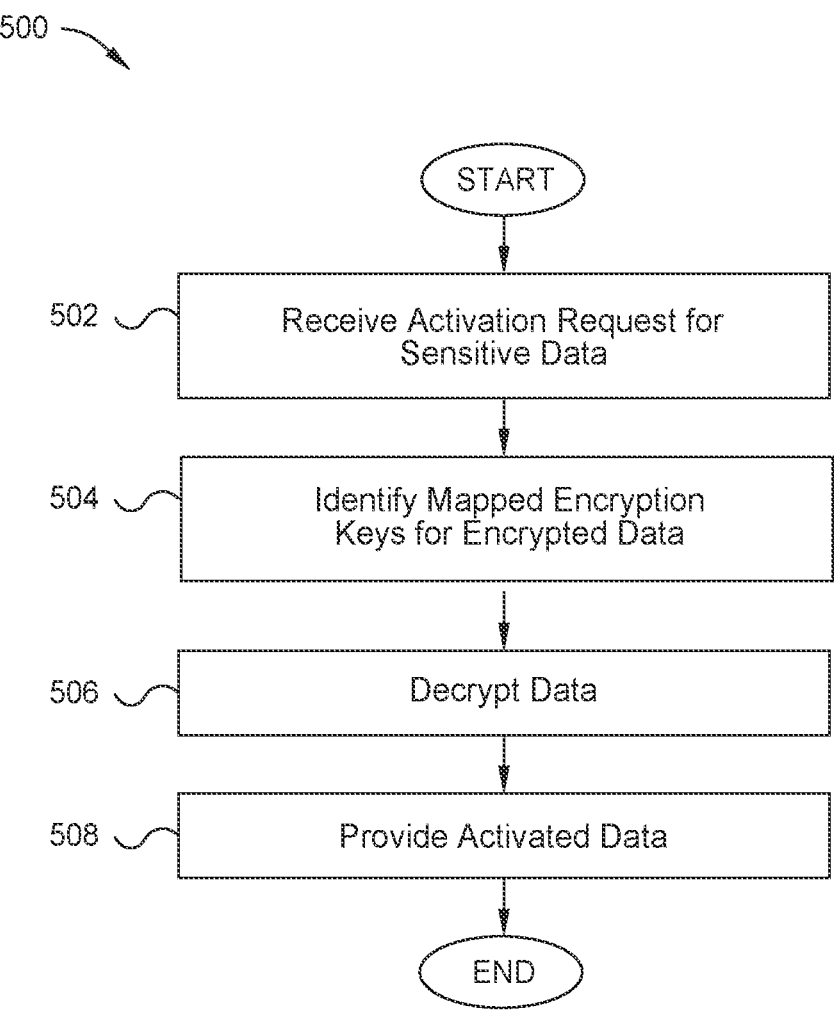
FIG. 5 is a flowchart illustrating activating protected sensitive data, according to an embodiment.

FIG. 5 is a flowchart 500 illustrating activating protected sensitive data, according to an embodiment. At block 502 a privacy service (e.g., the privacy service 214 illustrated in FIG. 2) receives an activation request for sensitive data.

At block 504, the privacy service identifies one or more mapped encryption keys for the encrypted data. For example, as illustrated in FIG. 1B, encrypted dimensions (e.g., the encrypted dimensions 170 illustrated in FIG. 1B) and a key store (e.g., the key store 180 illustrated in FIG. 1B) are needed to map the encryption keys for a given data item. The privacy service can follow links from the transformed data to the associated encryption keys.

At block 506, the privacy service decrypts the requested sensitive data. For example, the activation service can use the mapping identified by the privacy service at block 504 to identify the encryption keys associated with the requested data. In an embodiment, each data dimension can be separately governed such that one user may be able to decrypt certain sensitive information, but not others. For example, the privacy service can enforce access control to different types of sensitive information based on the principal requesting access to decrypt. Further, in an embodiment the encryption is symmetric (e.g., as discussed above in relation to block 306 illustrated in FIG. 3), so that the encryption keys used to encrypt the sensitive data can also be used to decrypt the sensitive data. At block 508, the privacy service then provides the activated (e.g., decrypted) sensitive data.

Figure 6:
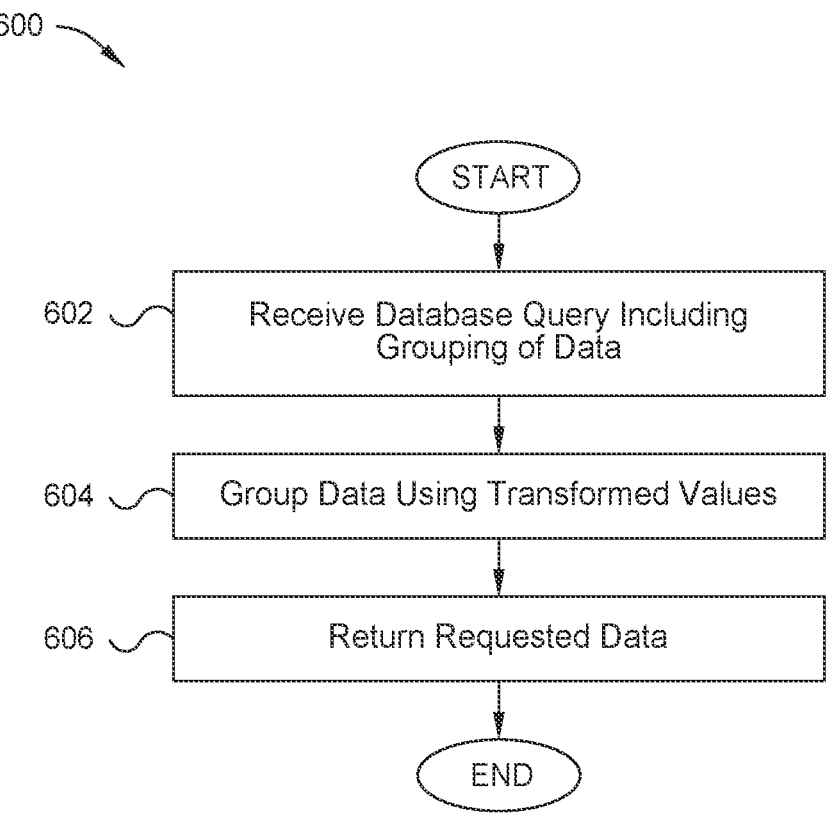
FIG. 6 is a flowchart illustrating grouping pseudonymized sensitive data, according to an embodiment.

FIG. 6 is a flowchart 600 illustrating grouping pseudonymized sensitive data, according to an embodiment. At block 602, a suitable software service (e.g., a database or data warehouse software service) receives a database query including grouping of data (e.g., a table join in a relational database). In an embodiment, any suitable service can be used.

At block 604, the service groups data using transformed values. As discussed above in relation to block 306 illustrated in FIG. 3, in an embodiment sensitive data is transformed (e.g., by hashing or using surrogate keys) using a deterministic technique. This means that a given field of sensitive data is guaranteed to be stored as the same value after transformation. Because of this, the sensitive data can be grouped using the transformed values. For example, database tables in a relational database can be joined using a transformed identifier value, because the transformed values for a give item of sensitive data are guaranteed to be the same in both tables. At block 606, the service returns the requested data (e.g., the data identified by grouping the sensitive data).

Figure 7:
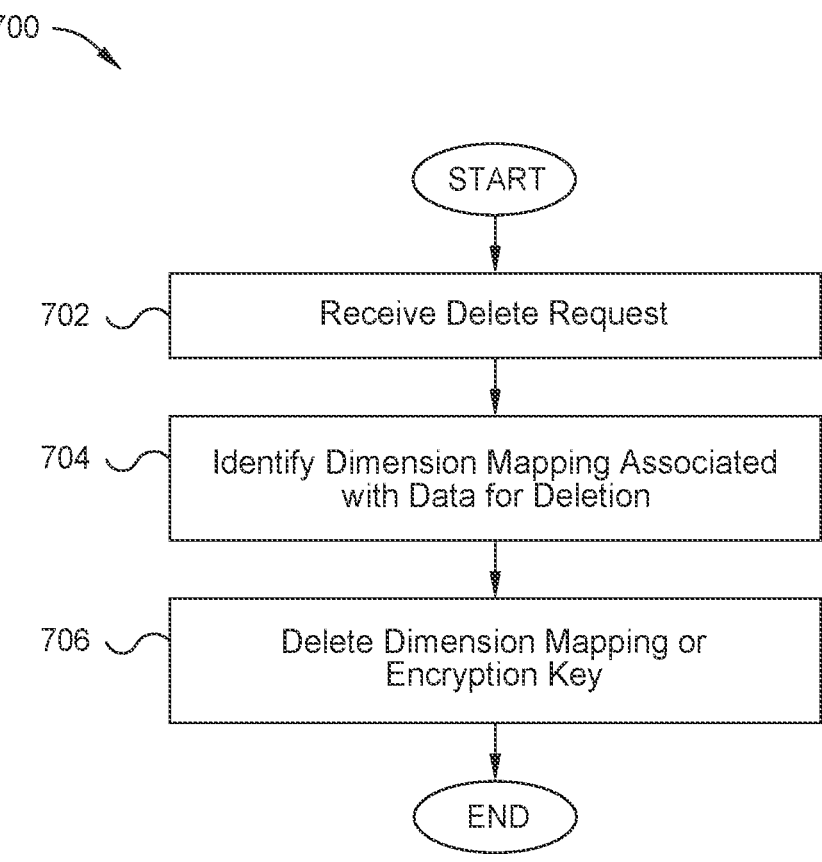
FIG. 7 is a flowchart illustrating deleting protected sensitive data, according to an embodiment.

FIG. 7 is a flowchart 700 illustrating deleting protected sensitive data, according to an embodiment. At block 702, a privacy service (e.g., the privacy service 214 illustrated in FIG. 2) receives a request to delete an item of sensitive data. At block 704, the privacy service identifies the dimension mapping associated with the data for deletion. For example, the privacy service can identify encrypted dimensions (e.g., encrypted dimensions 170 illustrated in FIG. 1B) associated with the data for deletion, using the transformed data as a link. Further, the privacy service can identify an encryption key associated with the data for deletion (e.g., located in the key store 180 illustrated in FIG. 1B).

Figure 8A:
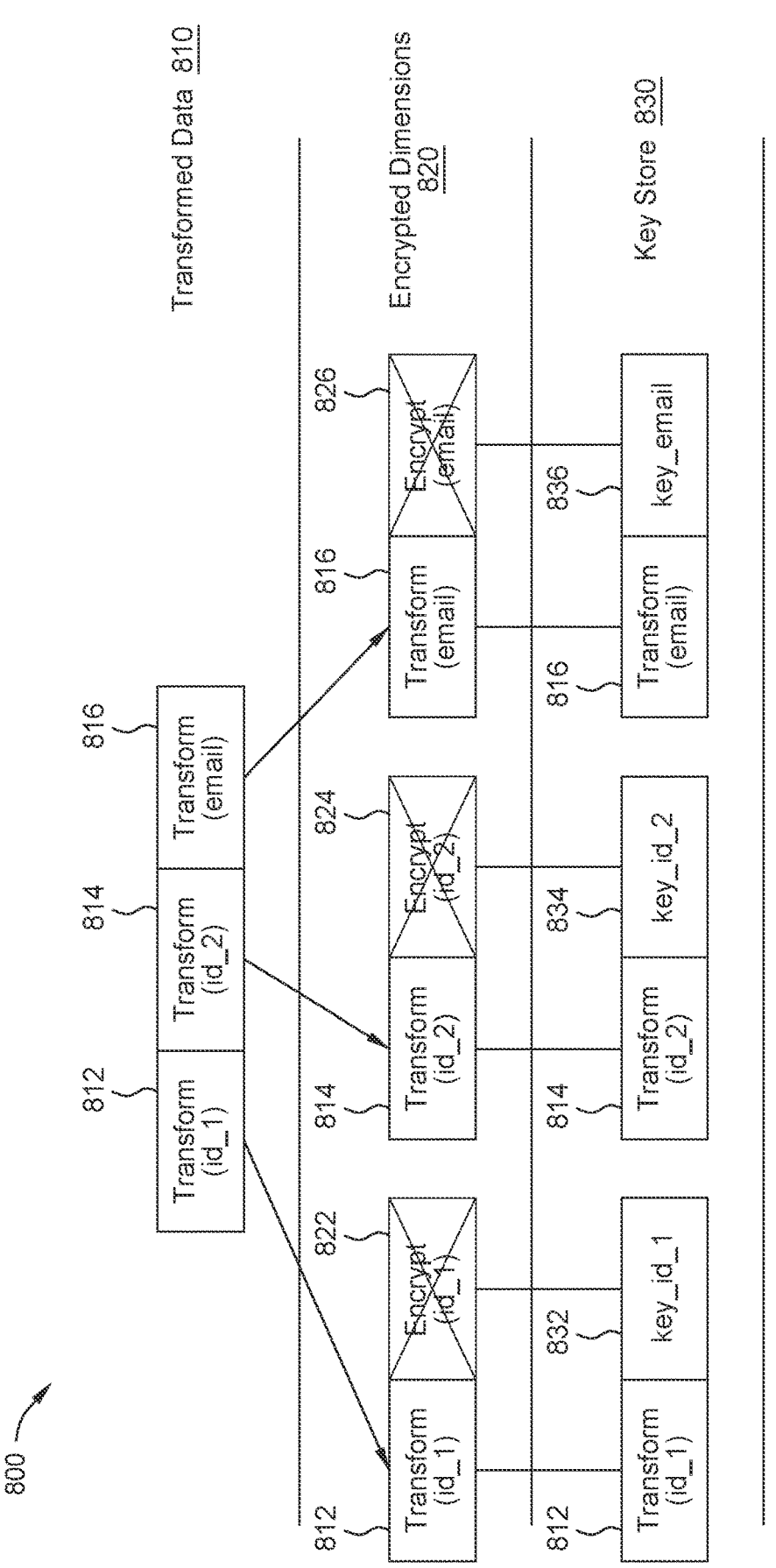
FIG. 8A is a block diagram illustrating deleting protected sensitive data, according to an embodiment.
Figure 8B:
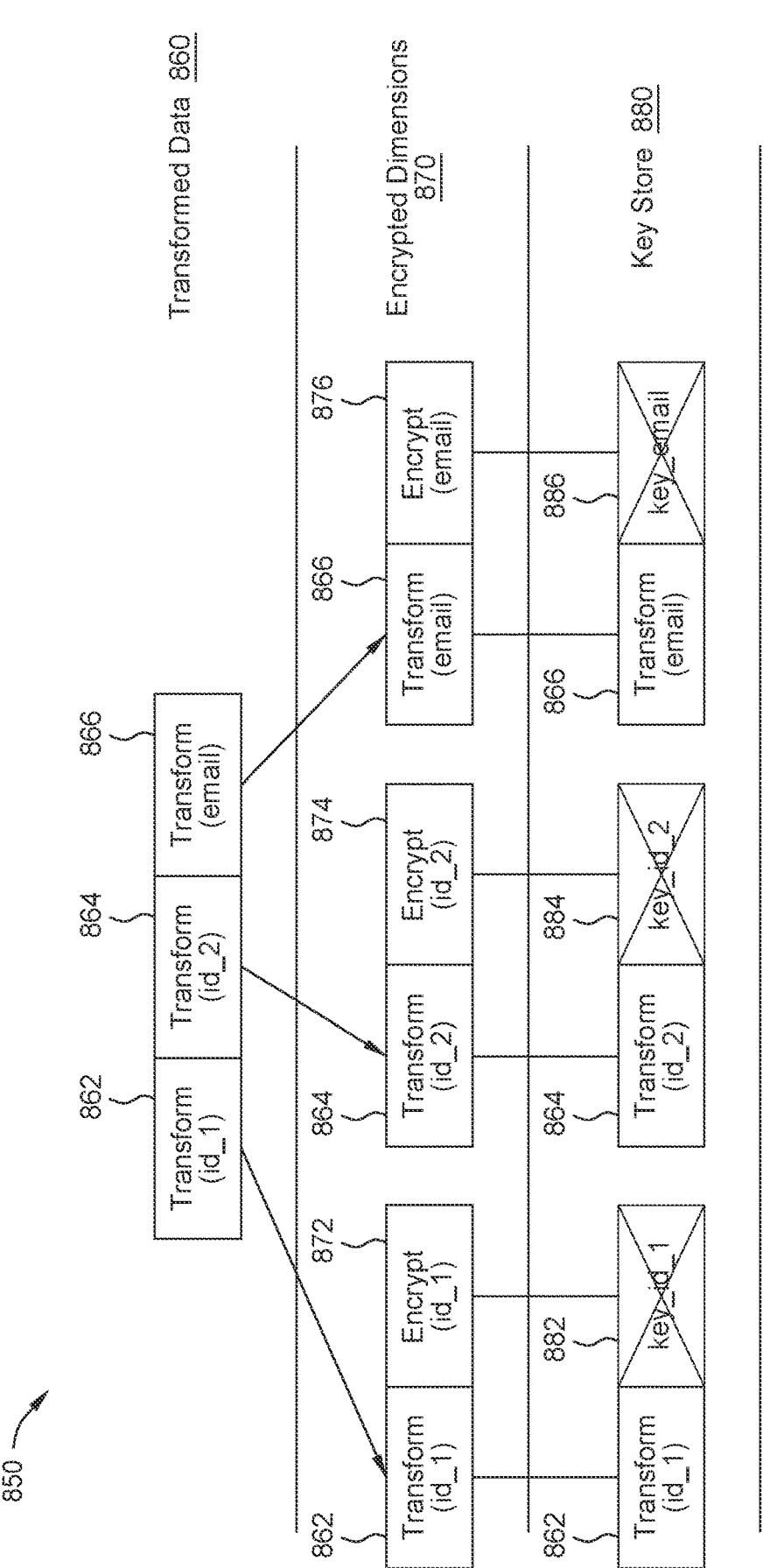
FIG. 8B is a block diagram further illustrating deleting protected sensitive data, according to an embodiment.

At block 706, the privacy service triggers the delete for the dimension key mapping or encryption key. As illustrated in FIGS. 8A-B, below, the privacy service can delete the data by deleting a dimension mapping (e.g., used to map the data to the encrypted data), an encryption key (e.g., needed to decrypt the encrypted data), or both.

FIG. 8A is a block diagram 800 illustrating deleting protected sensitive data, according to an embodiment. In an embodiment, FIG. 8A illustrates deletion of protected data illustrated in FIG. 1B. Again assume three fields are considered sensitive: id_1, id_2, and email. Transformed data 810 includes a transformed id_1 field 812, a transformed id_2 field 814, and a transformed email field 816. Encrypted dimensions 820 include the transformed fields 812, 814, and 816 linked with encrypted data 822, 824, and 826. A key store 830 includes the transformed fields 812, 814, and 816 linked with encryption keys 832, 834, and 836.

In an embodiment, data can be deleted by deleting the linked encrypted data in the encrypted dimensions 820. For example, the id_1 field data can be deleted by removing the encrypted id_1 data, or link, 822. The id_2 field data can be deleted by removing the encrypted id_2 data, or link, 824. The email field data can be deleted by removing the encrypted email data, or link, 826. As the transformed data is transformed using a one-way technique (e.g., a one-way hash or one-way surrogate keys), the original data cannot be recovered from the transformed data. Thus, removing the encrypted dimension link for the data serves to bar recovery of the data and delete the data.

FIG. 8B is a block diagram 850 further illustrating deleting protected sensitive data, according to an embodiment. In an embodiment, FIG. 8B illustrates deletion of protected data illustrated in FIG. 1B. Again assume three fields are considered sensitive: id_1, id_2, and email. Transformed data 860 includes a transformed id_1 field 862, a transformed id_2 field 864, and a transformed email field 866. Encrypted dimensions 870 include the transformed fields 862, 864, and 866 linked with encrypted data 872, 874, and 876. A key store 880 includes the transformed fields 862, 864, and 866 linked with encryption keys 882, 884, and 886.

In an embodiment, data can be deleted by deleting the encryption key in the key store 880. For example, the id_1 field data can be deleted by removing the encryption key 882. The id_2 field data can be deleted by removing the encryption key 884. The email field data can be deleted by removing the encryption key 886. As the transformed data is transformed using a one-way technique (e.g., a one-way hash or one-way surrogate keys), the original data cannot be recovered from the transformed data. Thus, removing the encryption key for the data serves to bar recovery of the data and delete the data.

The techniques described herein can be effective with any type of data set, not just sensitive data. However, the most valuable applications of these techniques are to use them in connection with high-cardinality data fields such as personal information or other sensitive data.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a plurality of data fields relating to a first data record;
   generating a plurality of transformed data fields by transforming each respective data field of the plurality of data fields using one or more transformations comprising at least one of: (i) a hash function or (ii) a surrogate key function;
   generating a plurality of encrypted data fields by encrypting each respective data field of the plurality of data fields using a respective encryption key of a plurality of encryption keys; and
   storing the plurality of transformed data fields, the plurality of encrypted data fields, and the plurality of encryption keys, comprising:
      storing the transformed data fields in one or more first storage locations;
      generating a first plurality of mappings that map each respective transformed data field, of the plurality of transformed data fields, to a respective encrypted data field of the plurality of encrypted data fields;
      storing the first plurality of mappings in one or more second storage locations distinct from the one or more first storage locations;
      generating a second plurality of mappings that map each respective transformed data field, of the plurality of transformed data fields, to a respective encryption key of the plurality of encryption keys; and storing the second plurality of mappings in one or more third storage locations distinct from the one or more first storage locations and the one or more second storage locations.

2. The method of claim 1, further comprising:
   receiving a request for the data fields;
   retrieving at least one of the first plurality of mappings and at least one of the second plurality of mappings, based on one or more transformed data fields relating to the requested data fields; and
   decrypting at least one of the data fields using an encrypted data field and an encryption key identified based on the first plurality of mappings and the second plurality of mappings.

3. The method of claim 2, further comprising:
   generating the transformed data fields relating to the requested data fields, wherein each of the transformed data fields acts as a respective link for the first plurality of mappings and the second plurality of mappings.

4. The method of claim 1, wherein each of the one or more transformations comprises a one-way hash function.

5. The method of claim 1, wherein each of the one or more transformations comprises a numeric surrogate key function.

6. The method of claim 1, further comprising:
   identifying a second plurality of data fields relating to a second data record;
   generating a second plurality of transformed data fields by transforming the second plurality of data fields using the one or more transformations; and
   determining to store the second plurality of transformed data fields, without corresponding encrypted data fields, wherein the second plurality of data fields are not recoverable from the second plurality of transformed data fields.

7. The method of claim 1, further comprising:
   receiving a request to delete the data fields; and
   based on the request, deleting at least a portion of at least one of: (i) the first plurality of mappings or (ii) the second plurality of mappings.

8. The method of claim 7, further comprising:
   based on the request, deleting at least a portion of both the first plurality of mappings and the second plurality of mappings.

9. The method of claim 1, wherein the one or more first storage locations, the one or more second storage locations, and the one or more third storage locations each comprises one or more separate tables in one or more electronic databases.

10. The method of claim 1, further comprising:
    receiving a request for a first metric relating to the first data record;
    grouping the first data record with a plurality of other data records using at least one of the transformed data fields; and
    returning a response to the request, based on the grouping.

11. The method of claim 10, wherein the grouping comprises a join operation using the at least one of the transformed data fields.

12. A non-transitory computer-readable medium containing computer program code that, when executed by operation of one or more computer processors, performs operations comprising:
    identifying a plurality of data fields relating to a first data record;
    generating a plurality of transformed data fields by transforming each respective data field of the plurality of data fields using one or more transformations comprising at least one of: (i) a hash function or (ii) a surrogate key function;

generating a plurality of encrypted data fields by encrypting each respective data field of the plurality of data fields using a respective encryption key of a plurality of encryption keys; and storing the plurality of transformed data fields, the plurality of encrypted data fields, and the plurality of encryption keys, comprising:

storing the transformed data fields in one or more first storage locations;

generating a first plurality of mappings that map each respective transformed data field, of the plurality of transformed data fields, to a respective encrypted data field of the plurality of encrypted data fields;

storing the first plurality of mappings in one or more second storage locations distinct from the one or more first storage locations;

generating a second plurality of mappings that map each respective transformed data field, of the plurality of transformed data fields, to a respective encryption key of the plurality of encryption keys; and storing the second plurality of mappings in one or more third storage locations distinct from the one or more first storage locations and the one or more second storage locations.

13. The non-transitory computer-readable medium of claim 12, the operations further comprising:

receiving a request for the data fields;

retrieving at least one of the first plurality of mappings and at least one of the second plurality of mappings, based on one or more transformed data fields relating to the requested data fields; and decrypting at least one of the data fields using an encrypted data field and an encryption key identified based on the first plurality of mappings and the second plurality of mappings.

14. The non-transitory computer-readable medium of claim 12, the operations further comprising:

identifying a second plurality of data fields relating to a second data record;

generating a second plurality of transformed data fields by transforming the second plurality of data fields using the one or more transformations; and determining to store the second plurality of transformed data fields, without corresponding encrypted data fields, wherein the second plurality of data fields are not recoverable from the second plurality of transformed data fields.

15. The non-transitory computer-readable medium of claim 12, the operations further comprising:

receiving a request to delete the data fields; and based on the request, deleting at least a portion of at least one of: (i) the first plurality of mappings or (ii) the second plurality of mappings.

16. The non-transitory computer-readable medium of claim 12, the operations further comprising:

receiving a request for a first metric relating to the first data record;

grouping the first data record with a plurality of other data records using at least one of the transformed data fields; and returning a response to the request, based on the grouping.

17. A system, comprising:

a computer processor; and a memory having instructions stored thereon which, when executed on the computer processor, performs operations comprising:

identifying a plurality of data fields relating to a first data record;

generating a plurality of transformed data fields by transforming each respective data field of the plurality of data fields using one or more transformations comprising at least one of: (i) a hash function or (ii) a surrogate key function;

generating a plurality of encrypted data fields by encrypting each respective data field of the plurality of data fields using a respective encryption key of a plurality of encryption keys; and storing the plurality of transformed data fields, the plurality of encrypted data fields, and the plurality of encryption keys, comprising:

storing the transformed data fields in one or more first storage locations;

generating a first plurality of mappings that map each respective transformed data field, of the plurality of transformed data fields, to a respective encrypted data field of the plurality of encrypted data fields;

storing the first plurality of mappings in one or more second storage locations distinct from the one or more first storage locations; and generating a second plurality of mappings that map each respective transformed data field, of the plurality of transformed data fields, to a respective encryption key of the plurality of encryption keys; and storing the second plurality of mappings in one or more third storage locations distinct from the one or more first storage locations and the one or more second storage locations.

18. The system of claim 17, the operations further comprising:

receiving a request for the data fields;

retrieving at least one of the first plurality of mappings and at least one of the second plurality of mappings, based on one or more transformed data fields relating to the requested data fields; and decrypting at least one of the data fields using an encrypted data field and an encryption key identified based on the first plurality of mappings and the second plurality of mappings.

19. The system of claim 17, the operations further comprising:

receiving a request to delete the data fields; and based on the request, deleting at least a portion of at least one of: (i) the first plurality of mappings or (ii) the second plurality of mappings.

20. The system of claim 17, the operations further comprising:

receiving a request for a first metric relating to the first data record;

grouping the first data record with a plurality of other data records using at least one of the transformed data fields; and returning a response to the request, based on the grouping.

* * * * *